F. H. SCHANIL.
TRACTOR ATTACHMENT.
APPLICATION FILED MAY 14, 1918.

1,296,434.

Patented Mar. 4, 1919.

Inventor.
F. H. Schanil,

Witnesses
J. H. Crawford
L. B. Middleton

By Victor J. Evans
Attorney

UNITED STATES PATENT OFFICE.

FRED H. SCHANIL, OF GAHERN, ALBERTA, CANADA.

TRACTOR ATTACHMENT.

1,296,434.     Specification of Letters Patent.     Patented Mar. 4, 1919.

Application filed May 14, 1918. Serial No. 234,548.

*To all whom it may concern:*

Be it known that I, FRED H. SCHANIL, a citizen of the United States of America, residing at Gahern, in the Province of Alberta and Dominion of Canada, have invented new and useful Improvements in Tractor Attachments, of which the following is a specification.

This invention relates to new and useful improvements in attachments for tractors, and the principal object of the invention is to provide means for connecting the tractor with the load, whereby, the said load may be released from the tractor, and left at a certain point while the tractor moves forward a certain distance, when the tractor is stopped and power applied to the attachment to bring the load up to the tractor.

Another object of the invention is to provide automatic means for releasing the power when the load reaches the coupling position.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
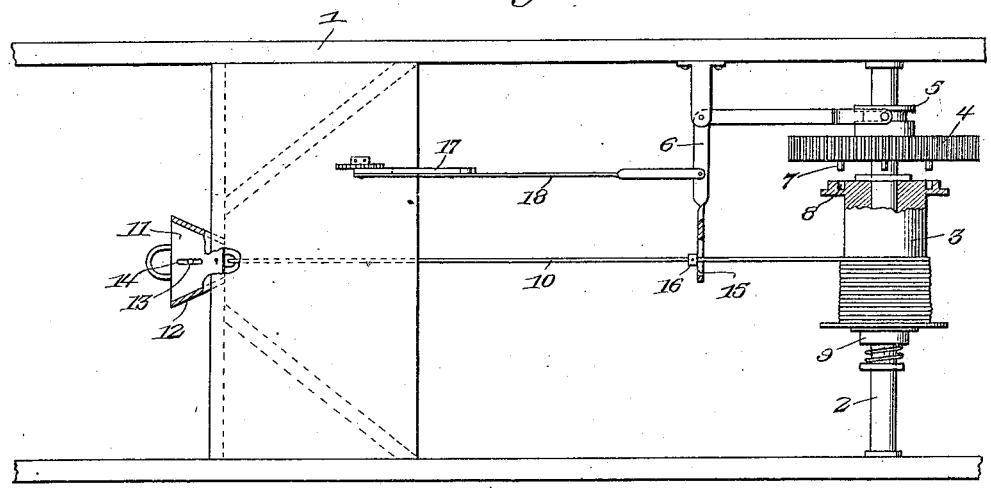
Figure 1 is a plan view of a part of a tractor with the improvement applied.
Figure 2:
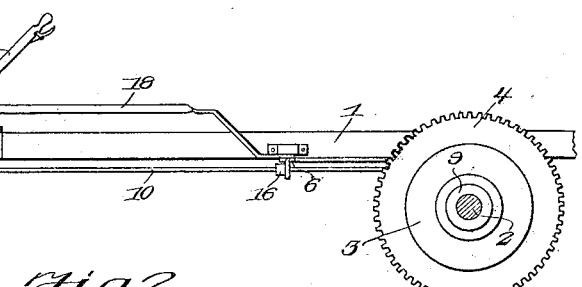
Fig. 2 is an elevation.
Figures 3, 4:
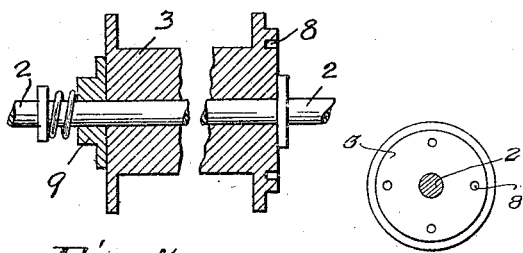
Fig. 3 is a detail view.

As shown in these views the improvement is applied to part of the tractor frame, which is indicated by the numeral 1. I prefer to place the attachment near the rear end of the tractor and adjacent the operator so that he may actuate the attachment without leaving his seat. It will, of course, be understood, however, that the attachment may be located at any suitable point on the tractor.

The attachment comprises a shaft 2, carried by the tractor frame, and having thereon a drum 3 and the gear wheel 4. The wheel 4 is adapted to be connected with the motor of the tractor, by any suitable means, and said wheel is free to rotate on said shaft. Said wheel is provided with a collar 5, having a groove therein, said groove receiving one end of the bell crank lever 6, which is pivoted to the tractor frame so that the movement of said lever will shift the gear on the shaft. Said gear is provided with a number of lugs 7, which are adapted to engage recesses 8, formed in one end of the drum 3, whereby said drum will be locked to the gear.

9 indicates a friction clutch carried by the shaft, and engaging the other end of the drum.

The drum receives a cable 10, which has its free end connected to the coupling head 11 by which the tractor is coupled to its load, which may be a plow, truck, or the like. 12 indicates a casing secured to the tractor frame, and adapted to receive the coupling head, which is secured therein by the pin 13 engaging the slot 14 in said head.

The cable passes through a hole 15 in the end of the lever 6 and the stop 16 on said cable is adapted to engage said lever to disconnect the gear wheel from the drum, when the coupling head enters the casing 12. The bell crank lever 6 is connected with a hand lever 17 by a link 18 so that the gear 4 may be shifted into and out of engagement with the drum, by hand.

In the normal operation of the invention the coupling head is held within the casing by means of the pin 13, and the gear wheel 4 is out of engagement with the drum. If the tractor should become stalled in muddy ground or otherwise, the coupling head is released from the casing by withdrawing the pin 13, so that the tractor may move without its load, and the cable will run off the drum to permit this operation. When the tractor reaches firm ground the same is stopped and the brakes applied, and then the gear wheel 4 is put in engagement with the drum, it being understood that the wheel 4 is in connection with the motor. This will cause the drum to wind up the cable and thus draw the load up to the tractor. When the coupling head reaches the casing the stop 16 will engage the lever 6 and thus disconnect the wheel from the drum. The pin 13 is then placed in engagement with the coupling head. The friction clutch 9 will prevent the drum from unwinding before the pin 13 is placed in position.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a tractor frame, a detachable coupling head, a casing secured to the frame for receiving the head, means for removably securing the coupling in the casing, a cable connected with the coupling head, and means for winding the cable by the motor.

2. In combination with a tractor frame, a detachable coupling head, a casing for the head connected with the frame, means for removably securing the coupling in the casing, a cable connected with the head, a drum receiving the cable, a gear wheel connected with the motor, means for shifting said gear into and out of engagement with the drum, and means for automatically disconnecting said gear from the drum when the coupling head reaches its normal position.

In testimony whereof I affix my signature.

FRED H. SCHANIL.

Copies of this patent may be obtained for five cents each, by addressing the "Commissioner of Patents, Washington, D. C."